(12) United States Patent
Mutschler et al.

(10) Patent No.: US 10,710,064 B2
(45) Date of Patent: Jul. 14, 2020

(54) PAG COMPRESSOR OIL CONDITIONING FILTER ELEMENT

(71) Applicant: Schroeder Industries, LLC, Leetsdale, PA (US)

(72) Inventors: Scott Mutschler, Aliquippa, PA (US); Kelly Zinn, North Fort Myers, FL (US); Will Hurley, Atlanta, GA (US); Augustus O. Schroeder, Pittsburgh, PA (US); Ken Waldron, Eden Prairie, MN (US)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 0 days.

(21) Appl. No.: 16/219,075

(22) Filed: Dec. 13, 2018

(65) Prior Publication Data
US 2019/0126263 A1 May 2, 2019

Related U.S. Application Data

(63) Continuation of application No. PCT/US2017/037201, filed on Jun. 13, 2017.
(Continued)

(51) Int. Cl.
*F01M 1/10* (2006.01)
*B01J 41/07* (2017.01)
(Continued)

(52) U.S. Cl.
CPC ............ *B01J 41/07* (2017.01); *B01D 24/008* (2013.01); *B01D 24/04* (2013.01); *F01M 1/10* (2013.01);
(Continued)

(58) Field of Classification Search
CPC .... B01D 15/363; B01D 27/02; B01D 27/146; B01D 27/148; B01D 24/008; B01D 24/04;
(Continued)

(56) References Cited

U.S. PATENT DOCUMENTS

| 2,110,318 A | * | 3/1938 | Baruch | B01D 27/02 |
| | | | | 210/287 |
| 2,796,989 A | * | 6/1957 | Kovacs | B01D 29/15 |
| | | | | 210/282 |

(Continued)

OTHER PUBLICATIONS

Fluid Metrics, Compressor Oil Purifier, Aug. 2013 (retrieved on Oct. 21, 2019). Retrieved from the internet <www.fluidmetrics.com/cop.html>. (Year: 2013).*

(Continued)

*Primary Examiner* — Matthew O Savage
(74) *Attorney, Agent, or Firm* — Blynn L. Shideler; Krisanne Shideler; BLK Law Group

(57) ABSTRACT

A PAG compressor oil conditioning filter element configured for outside in flow includes a proximal and a distal end cap, wherein the proximal endcap includes a central outlet therein, a cylindrical outer wrap having perforations there through on a portion of the outer wrap adjacent the distal end cap, wherein the flow of PAG compressor oil is configured to flow into the element through the perforations in conventional operation, an annular layer of ion exchange polymers beads radially within the outer wrap configured to remove acid from the treated PAG compressor oil, an annular particulate removing micro-glass media radially within the annular layer of ion exchange polymers beads and configured to remove particulates from the treated PAG compressor oil; and a central flow area radially within the particulate removing micro-glass media and in fluid communication with the central outlet.

20 Claims, 2 Drawing Sheets

Related U.S. Application Data

(60) Provisional application No. 62/349,264, filed on Jun. 13, 2016.

(51) Int. Cl.
*B01D 24/00* (2006.01)
*B01D 24/04* (2006.01)

(52) U.S. Cl.
CPC ............... *F01M 2001/1007* (2013.01); *F01M 2001/1014* (2013.01)

(58) Field of Classification Search
CPC ........... B01J 41/07; B01J 47/024; F01M 1/10; F01M 2001/1007; F01M 2001/1014
USPC ................................. 210/282, 683, 689, 690
See application file for complete search history.

(56) References Cited

U.S. PATENT DOCUMENTS

| | | |
|---|---|---|
| 5,024,764 A | 6/1991 | Holler |
| 5,061,367 A * | 10/1991 | Hatch ..................... C02F 1/003 210/137 |
| 5,082,568 A | 1/1992 | Holler |
| 5,094,745 A | 3/1992 | Reynolds |
| 5,707,536 A | 1/1998 | Meissner |
| 7,172,694 B2 | 2/2007 | Bortnik |
| 8,246,817 B2 | 8/2012 | Kumar et al. |
| 2004/0222140 A1 | 11/2004 | Bortnik |
| 2005/0077224 A1* | 4/2005 | White ..................... B01D 24/08 210/282 |
| 2011/0089114 A1* | 4/2011 | Livingstone ........... B01D 15/00 210/683 |
| 2012/0118809 A1* | 5/2012 | Bauer ..................... B01D 29/11 210/263 |

OTHER PUBLICATIONS

Sigma-Aldrich, DOWEX M-43 free base, Feb. 2017 (retrieved on Oct. 21, 2019), Retrieved from the internet <www.sigmaaldrich.com/catalog/product/supelco/14032u?lang=en&region=US>. (Year: 2017).*

* cited by examiner

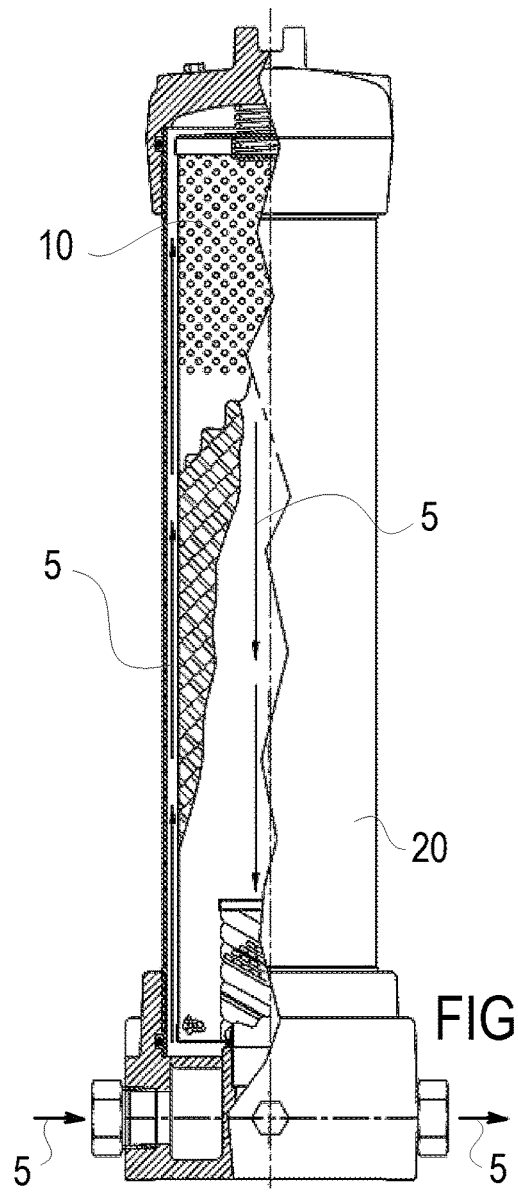
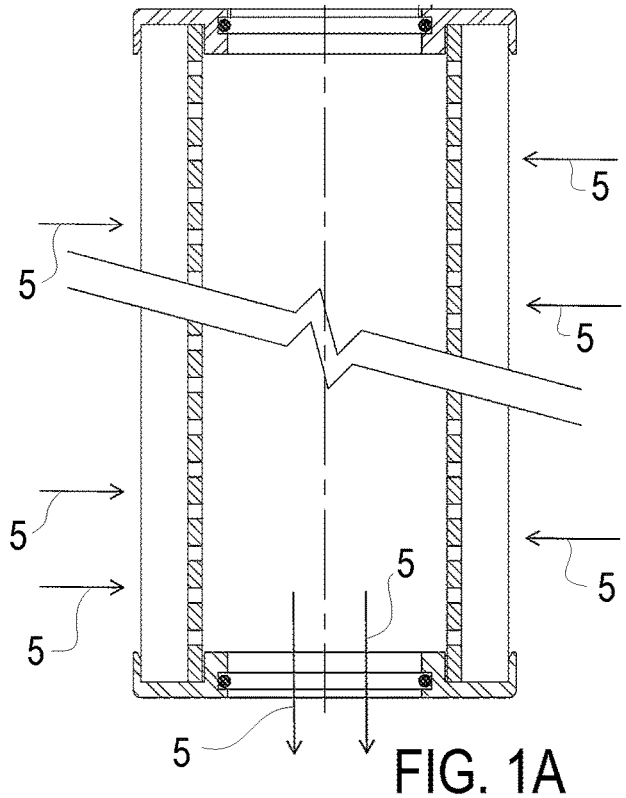
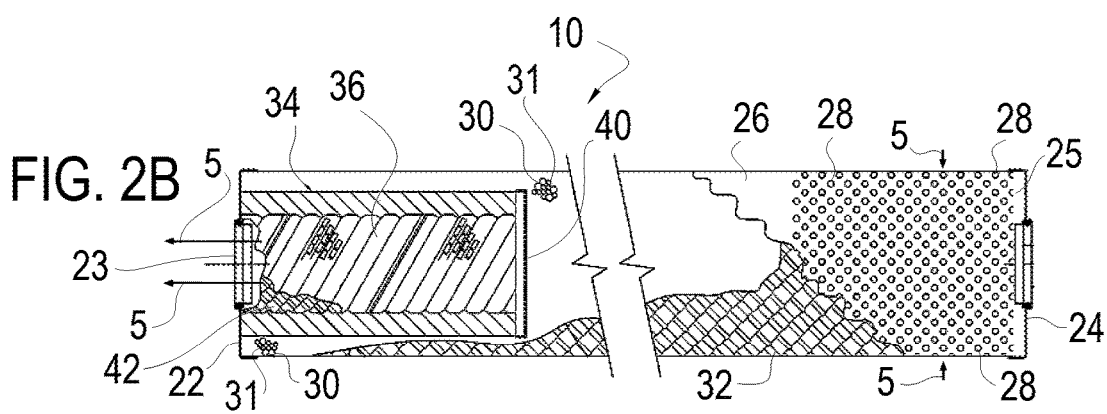

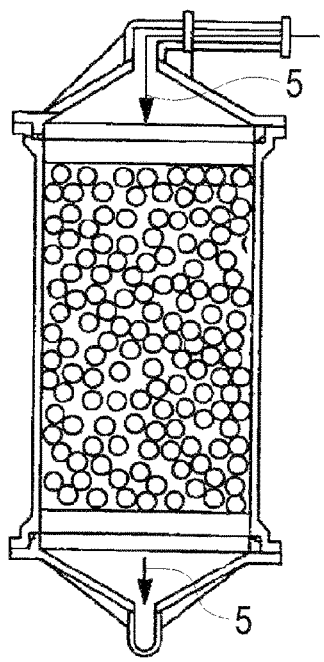
FIG. 1B
PRIOR ART
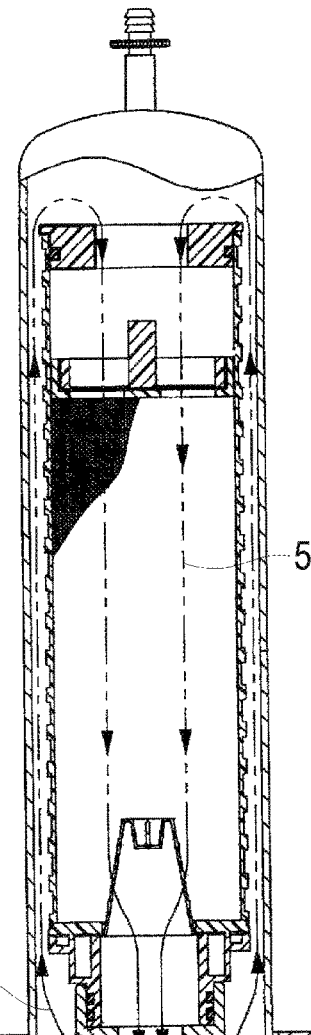
FIG. 1C
PRIOR ART
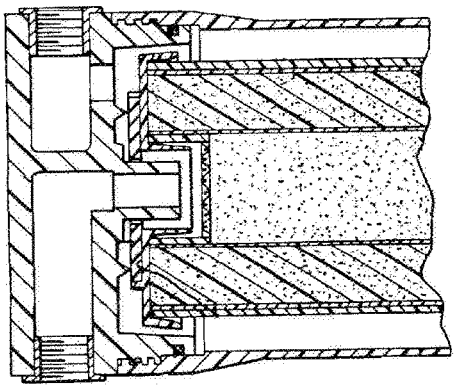
FIG. 1D
PRIOR ART
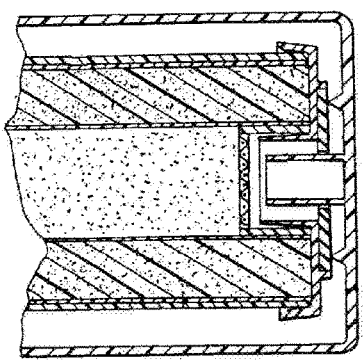

PAG COMPRESSOR OIL CONDITIONING FILTER ELEMENT

CROSS-REFERENCE TO RELATED APPLICATION

This application is a continuation of International Patent Application Serial Number PCT/US 2017/037201 filed Jun. 13, 2017 and which is incorporated herein by reference. International Patent Application Serial Number PCT/US 2017/037201 claims the benefit of U.S. Provisional Patent Application Ser. No. 62/349,264, entitled "PAG Compressor Oil Conditioning Filter Element", filed on Jun. 13, 2016, which is incorporated herein by reference.

BACKGROUND OF THE INVENTION

1. Field of the Invention

The present invention relates generally to filter elements, more specifically to filter elements for conditioning PAG compressor oil.

2. Description of Related Art

PAG oil stands for polyalkylene glycol oil and is a type of synthetic lubricant which was among the first developed for commercial and industrial use. PAG oil comes in different viscosities for specialty applications. It has long been used by vehicle air-conditioning compressor manufacturers because of its outstanding lubricity and biodegradable properties. Recent developments have led to food-grade lubricants that are FDA approved for use with equipment that may accidentally come in contact with food and PAG is an H1 approved lubricant base-stock. PAG Compressor Oils are specifically developed for use in centrifugal and oil-flooded rotary screw and rotary vane compressors and are suitable for year-round use due to their excellent high and low-temperature properties.

Solid particulates present in lubricants in general, including those used in compressors, may cause damage to machine components and properly maintained filtration system can greatly improve lubricant life and machine performance. For reference, FIG. 1A is a schematic section side view of a conventional outside in filter element with the flow path 5 there through illustrated.

PAG oil, including PAG compressor oil, can react with air to form organic acids. This oxidation rate is low at ambient conditions but increases rapidly with temperature. These acids can undergo free radical polymerization which will increase the fluid viscosity and ultimately can result in deposits and damage to the life and operation of a compressor system.

As discussed below the present invention utilizes ion exchange polymer beads combined with particulate filter elements to form a composite filter element for PAG compressor oil treatment, and similar combinations of these components has been known for other applications. For example U.S. Pat. No. 8,246,817, which is incorporated herein by reference, from Ford Motor Company disclosed a deionization filter for removing ions from a coolant in an electric fuel cell vehicle cooling system. The deionization filter includes a filter housing having an ion exchange bed having positively-charged and negatively-charged ion exchange resin beads for removing negative and positive ions, respectively, from the coolant. Further, at least one filter assembly is typically provided in the filter housing for filtering particles from the coolant. This arrangement is shown in FIG. 1B with flow path 5 shown.

U.S. Pat. No. 5,707,536, which is incorporated herein by reference, discloses a filter cartridge containing Ion exchange polymer beads for purifying fluids, such as water, with an interior compartment containing a fixed septum and a moveable piston-like septum. The resin beads are packed between the fixed septum and the moveable septum. The moveable septum is displaced upstream to account for expansion of the resin beads while the flow of the fluid through the filter cartridge causes the upstream septum to maintain a packing pressure on the resin beads. The downstream fixed septum will preferably have a cone-like shape. This arrangement is shown in FIG. 1C with flow path 5.

U.S. Pat. Nos. 5,082,568 and 5,024,764, which are incorporated herein by reference, disclose a composite filter for treating water comprising a cylindrical block of bonded powdered activated carbon with a hollow axial open interior. The hollow open interior of the filter block is filled with a powdered deionizing resin, specifically a cation deionizing resin is utilized. The resin comprises a cation deionizing resin in the hydrogen form having styrene-DVB (divinylbenzene) sulfonic copolymer active group. The deionizing resin preferably includes an anion deionizing resin mixed with the cation resin previously described in order to maintain a proper pH balance and stoichiometric balance in the filtered water. The anion deionizing resin comprises one in the hydroxide form in which the copolymer active group is styrene-DVB quarter ammonium hydroxide. A 50/50 mixture by weight of the foregoing deionizing resins was disclosed. This arrangement is shown in FIG. 1D.

The applicant's prior filter assembly set forth in 2004/0222140, now U.S. Pat. No. 7,172,694, was cited in of International Patent Application Serial Number PCT/US 2017/037201. This publication teaches a filter assembly adapted for use in filtering fluid flow in turbomachinery. The filter assembly includes a cylindrical housing, and a filter element disposed within the housing. The housing is adapted for fluid connection to a turbomachine. The filter element is adapted to filter fluid passing to the turbomachine. The filter element includes a fluid permeable core element defining a central core element flow channel through the filter element, a fluid permeable ion exchange resin layer disposed about the core element and adapted to remove mineral and organic acids from the fluid passing through the filter element, and a pleated filter media disposed about the ion exchange resin layer and core element. In another embodiment, the filter element has the pleated filter media disposed about the core element, and the fluid permeable ion exchange resin layer disposed about the core element and pleated filter media.

Allied Signal's prior filter assembly set forth in U.S. Pat. No. 5,094,745 was cited in of International Patent Application Serial Number PCT/US 2017/037201 and in applicant's '694 patent. This publication teaches a coolant filter comprising a conventional, circumferentially extending array of pleated filter paper which is installed within a conventional metal spin-on filter can which is installed on the mounting bracket provided by the engine manufacturer. The pleated paper array circumscribes a sealed metal container which contains ion exchange beads for softening and conditioning the coolant, and also includes an inhibitor pellet which dispenses rust inhibitor into the coolant. Coolant is first directed through the filtering media, which removes particulate matter from the coolant, and then is directed to flow axially through the inhibitor pack. Screened inlet and outlet openings through which the coolant passes through the metal container assure that the ion exchange resin beads remain within the container. The design also assures that all of the coolant communicated through the filter media is also exposed to the chemicals within the container.

There remains a need for a simple PAG compressor oil filtration system addressing acid build up and solid particulates within the PAG compressor oil.

SUMMARY OF THE INVENTION

The present invention provides a PAG compressor oil conditioning filter element configured for outside in flow including a proximal and a distal end cap, wherein the proximal endcap includes a central outlet therein, a cylindrical outer wrap having perforations there through on only a portion of the outer wrap adjacent the distal end cap, wherein the flow of PAG compressor oil is configured to flow into the element through the perforations in conventional operation, an outer layer of ion exchange polymers beads radially within the outer wrap configured to remove acid from the treated PAG compressor oil, an annular particulate removing micro-glass media radially within at least a portion of the outer layer of ion exchange polymers beads and configured to remove particulates from the treated PAG compressor oil; and a central flow area radially within the particulate removing micro-glass media and in fluid communication with the central outlet.

The PAG compressor oil conditioning filter element according to one aspect of the invention provides wherein the portion of the outer wrap adjacent the distal end cap having perforations is at least 15% of the length of the outer wrap and is 3-4 cm in length and wherein the perforations are in a continuous grid of about 0.3175 cm (0.125 inch) sized holes about the circumference of the outer wrap.

The PAG compressor oil conditioning filter element according to one aspect of the invention further includes an outer scrim sleeve radially within the outer wrap.

The PAG compressor oil conditioning filter element according to one aspect of the invention provides wherein the outer layer of ion exchange polymers beads is an insoluble matrix formed by the small 0.45-0.65 mm diameter (about 0.0177-0.0256 inch) beads fabricated from an organic polymer substrate, and wherein the outer layer of ion exchange polymers beads is formed from a macro-porous polystyrenic weak base anion resin having tertiary amine functionality.

The PAG compressor oil conditioning filter element according to one aspect of the invention provides wherein the outer layer of ion exchange polymers beads further include solid additives that condition the PAG compressor oil being treated to minimize swelling of the ion exchange beads.

The PAG compressor oil conditioning filter element according to one aspect of the invention further includes a foam spacer adjacent the distal endcap.

The PAG compressor oil conditioning filter element according to one aspect of the invention provides wherein the micro-glass media is a 3 micron micro-glass media and wherein the micro-glass media extends from about 5 cm (about 2 inches) to about 15 cm (About 6 inches) along the length of the element from the proximal endcap.

The PAG compressor oil conditioning filter element according to one aspect of the invention further includes a stainless steel element cap closing a top of the micro-glass media element.

The PAG compressor oil conditioning filter element according to one aspect of the invention further includes a central flow area radially within the particulate removing micro-glass media and in fluid communication with the central outlet.

The PAG compressor oil conditioning filter element according to one aspect of the invention further includes an inner scrim sleeve provided within the micro-glass element.

The PAG compressor oil conditioning filter element according to one aspect of the invention provides wherein the element is configured to be received within filter housing which includes a base with inlet and outlet ports, a housing sleeve and an end cap.

These and other advantages of the present invention will be clarified in the detailed description of the preferred embodiments taken together with the associated figures in which like reference numeral represent like elements throughout.

BRIEF DESCRIPTION OF THE FIGURES

FIG. 1A is a schematic section side view of a conventional prior art outside in filter element with the conventional flow path illustrated;

FIG. 1B is a sectional side view of a known composite Ion exchange polymers bead and particulate filter assembly for treating coolant in an electric fuel cell vehicle;

FIG. 1O is a sectional side view of a known composite Ion exchange polymers bead and particulate filter assembly for treating water;

FIG. 1D is a sectional side view of a known composite Ion exchange polymers bead and particulate filter assembly for treating water;

FIG. 2A is an elevational view, partially in section of a PAG compressor oil conditioning filter element and filter housing according to one embodiment of the present invention; and FIG. 2B is a side elevation view partially in section of the filter element of FIG. 2A.

DETAILED DESCRIPTION OF THE INVENTION

It is noted that, as used in this specification and the appended claims, the singular forms "a," "an," and "the" include plural referents unless expressly and unequivocally limited to one referent. The various embodiments and examples of the present invention as presented herein are each understood to be non-limiting with respect to the scope of the invention.

As noted above PAG oil stands for polyalkylene glycol oil and is a type of synthetic lubricant and PAG compressor oils are specifically developed for use in centrifugal and oil-flooded rotary screw and rotary vane compressors. The present invention provides a simple PAG compressor oil filtration system addressing acid build up and solid particulates within the PAG compressor oil which comprises a PAG compressor oil conditioning filter element 10 within a filter housing 20 as shown in FIG. 2A.

The filter housing 20 includes a base with inlet and outlet ports, a housing sleeve or body and an end cap, the construction of which is generally known in the art.

The present invention provides a PAG compressor oil conditioning filter element 10 configured for outside in flow as shown in FIGS. 2A and B with the flow path 5 directed toward the distal end of the element 10 prior to entering the filter element 10. The flow of the present invention is in contrast to the conventional flow of prior art outside in filter elements as schematically shown in FIG. 1A or the axial flow of the designs of FIG. 1C:

The present invention provides a PAG compressor oil conditioning filter element 10 configured for outside in flow including a proximal end cap 22 and a distal end cap 24. The proximal endcap 22 includes a central outlet 23 as shown in FIG. 2B. The endcaps 22 and 24 may be made of metal, such as stamped out of steel or formed of plastic. The end caps 22 and 24 of the PAG compressor oil conditioning filter element 10 may be effectively formed from stainless steel.

The distal end cap 24 may include bypass valve elements, the details of which are not shown in detail. Bypass valves are a known safety feature allowing the flow 5 through the filter housing 20 to bypass the filter element 10 when the filter element 10 is clogged to prevent the undesired buildup of pressure in the system. The endcaps 22 and 24 additionally may include conventional sealing elements, such as O-rings or the like.

The PAG compressor oil conditioning filter element 10 according to the present invention includes a cylindrical outer wrap 26 having perforations 28 there through on only a portion of the outer wrap 26 which is adjacent the distal end cap 24, such as 3-4 cm (about 1 ½ inches) of the outer wrap 26. Preferably at least 15% of the length of the outer wrap 26. The perforations 28 are in a continuous grid of about 0.3175 cm (0.125 inch) sized holes about the circumference of the outer wrap 26 only on the distal end thereof. With this configuration the flow 5 of PAG compressor oil is configured to flow into the element 10 through the perforations 28 in conventional non-bypass operation, which causes flow 5 to run initially parallel to the element 10 and enter at the distal end where the perforations 28 are provided creating a greater travel path over the ion exchange polymer layer or beads 30 which layer is discussed below.

The PAG compressor oil conditioning filter element 10 according to the present invention includes an outer scrim sleeve 32 radially within the outer wrap 26. The outer scrim sleeve 32 made of a polyester fiber, helps to contain the resin beads 30 within the filter element 10.

The PAG compressor oil conditioning filter element 10 according to the present invention includes an outer layer of ion exchange polymers beads 30 radially within the outer wrap 26 configured to remove acid from the treated PAG compressor oil. The ion-exchange polymer beads 30, also called ion exchange resin beads 30, is an insoluble matrix or support structure formed by the small 0.45-0.65 mm diameter (about 0.0177-0.0256 inch) beads 30 fabricated from an organic polymer substrate, generally based on crosslinked polystyrene. The beads 30 are preferably porous, providing a high surface area. The trapping of ions occurs with the accompanying releasing of other ions; thus the process is called ion-exchange. The resin beads 30 are a weak base anion exchanger. One acceptable type is sold under the PUROLITE A-100 brand and is a macro-porous polystyrenic weak base anion resin having tertiary amine functionality and because of its porosity characteristics PUROLITE A-100 brand beads 30 show excellent properties for removal of naturally occurring organic species from fluid. The present design maximizes the amount of the resin beads 30 within the constraint of the outer wrap 26 and maximizes the flow path through the beads 30.

The PAG compressor oil conditioning filter element 10 according to the present invention may further include solid additives 31 that condition the PAG compressor oil being treated to minimize swelling of the ion exchange beads 30. One method is using solid additive 31 particles mixed in with the resin beads 30.

The PAG compressor oil conditioning filter element according to the present invention may include about 1.27 cm (½ inch) foam spacer 25 adjacent the distal endcap 24 near the inlet of the oil into element 10. The spacer 25, if provided, allows for expansion of ion exchange beads 30.

The PAG compressor oil conditioning filter element 10 according to the present invention includes an annular particulate removing micro-glass media 34 radially within at least a portion of the outer layer of ion exchange polymers beads 30 and configured to remove particulates from the treated PAG compressor oil. Acceptable micro-glass media is a 3 micron micro-glass media such as sold under the Z-MEDIA® mark from Schroeder Industries. The flow 5 of the fluid enters through the top or sides of the particulate element or media 34 after it passes through the resin beads 30. The micro-glass media element 34 extends from about 5 cm (about 2 inches) to about 15 cm (about 6 inches) along the length of the element from the proximal endcap 22. A stainless steel element cap 40 closes the top of the micro-glass media element 34. The design of the micro-glass media element 34 with the end cap 40 assures the long path through the resin beads 30 and through the media 34.

The PAG compressor oil conditioning filter element 10 according to the present invention includes a central flow area 36 radially within the particulate removing micro-glass media 34 and in fluid communication with the central outlet 23. An inner scrim sleeve 42 may be provided within the micro-glass element 34 which will prevent any unwanted migration of beads or solid additives into the central flow area 36.

The PAG compressor oil conditioning filter element 10 according to the present invention and the associated filter housing 20 have been expressly and particularly designed for treating PAG compressor oil. PAG compressor oil, like organic heat transfer fluids, react with air to form organic acids. This oxidation rate is low at ambient conditions but increases rapidly with temperature. These acids can undergo free radical polymerization which will increase the fluid viscosity and ultimately can result in deposits. The Total Acid Number (TAN) is a measure of the organic acid concentration in the fluid. The PAG compressor oil conditioning filter element 10 according to the present invention provides for efficient and effective removal of acids and clearance-size solid particulate that are the root cause of high compressor maintenance costs. The PAG compressor oil conditioning filter element 10 according to the present invention yields an effective increase the service life of expensive compressor fluids. The PAG compressor oil conditioning filter element 10 according to the present invention provides for control fluid TAN, pH & Viscosity and reduces corrosion of compressor system components.

The present invention has been described with reference to specific details of particular embodiments thereof. It is not intended that such details be regarded as limitations upon the scope of the invention except insofar as and to the extent that they are included in the accompanying claims. A number of variations to the present invention will be apparent to those of ordinary skill in the art and these variations will not depart from the spirit and scope of the present invention. The scope of the invention is defined by the appended claims and equivalents thereto.

We claim:

1. A PAG compressor oil conditioning filter element (10) configured for outside in flow comprising:
   a proximal end cap (22) and a distal end cap (24), wherein the proximal endcap (22) includes a central outlet (23) therein;

a cylindrical outer wrap (26) between the end caps (22 and 24) having perforations (28) there through on only a portion of the outer wrap (26) adjacent the distal end cap (24), wherein the flow (5) of PAG compressor oil is configured to flow into the element (10) through the perforations (28) in conventional operation;

an outer layer of ion exchange polymers beads (30) radially within the outer wrap (26) configured to remove acid from the treated PAG compressor oil;

an annular particulate removing micro-glass media (34) adjacent the proximal end cap (22) and radially within at least a portion of the outer layer of ion exchange polymers beads (30) and configured to remove particulates from the treated PAG compressor oil, wherein a distal end of the micro-glass media (34) is axially spaced from the portion of the outer wrap (26) having perforations (28) whereby the portion of the outer wrap (26) having perforations (28) is positioned axially closer to the distal end cap (24) than the distal end of the micro-glass media (34); and a central flow area (36) radially within the particulate removing micro-glass media (34) and in fluid communication with the central outlet (23).

2. The PAG compressor oil conditioning filter element according to claim 1 wherein the portion of the outer wrap (26) adjacent the distal end cap (24) having perforations (28) is at least 15% of the length of the outer wrap (26).

3. The PAG compressor oil conditioning filter element according to claim 1 wherein the portion of the outer wrap (26) adjacent the distal end cap (24) having perforations (28) is 3 to 4 cm in length.

4. The PAG compressor oil conditioning filter element according to claim 1 wherein the perforations (28) are in a continuous grid of 0.3175 cm sized holes about the circumference of the outer wrap (26).

5. The PAG compressor oil conditioning filter element according to claim 1 further including an outer scrim sleeve (32) radially within the outer wrap (26).

6. The PAG compressor oil conditioning filter element according to claim 1 wherein the outer layer of ion exchange polymers beads (30) is an insoluble matrix including 0.45-0.65 mm diameter beads fabricated from an organic polymer substrate.

7. The PAG compressor oil conditioning filter element according to claim 1 wherein the outer layer of ion exchange polymers beads (30) is formed from a macro-porous polystyrenic weak base anion resin having tertiary amine functionality.

8. The PAG compressor oil conditioning filter element according to claim 1 wherein the outer layer of ion exchange polymers beads (30) further include solid additives that condition the PAG compressor oil being treated to minimize swelling of the ion exchange beads (30).

9. The PAG compressor oil conditioning filter element according to claim 1 further including a foam spacer adjacent the distal endcap (24).

10. The PAG compressor oil conditioning filter element according to claim 1 wherein the micro-glass media is a 3 micron micro-glass media.

11. The PAG compressor oil conditioning filter element according to claim 1 wherein the micro-glass media (34) extends from 5 cm to 15 cm along the length of the element (10) from the proximal endcap (22).

12. The PAG compressor oil conditioning filter element according to claims 1 further including a stainless steel element cap (40) closing a top of the micro-glass media element (34).

13. The PAG compressor oil conditioning filter element according to claim 1 further including a stainless steel element cap (40) closing a top of the micro-glass media element (34) and an inner scrim sleeve (42) provided within the particulate removing micro-glass media (34).

14. The PAG compressor oil conditioning filter element according to claim 1 further including an inner scrim sleeve (42) provided within the micro-glass element (34).

15. The PAG compressor oil conditioning filter element according to claim 1 wherein the element (10) is configured to be received within filter housing (20) which includes a base with inlet and outlet ports, a housing sleeve and an end cap.

16. A PAG compressor oil conditioning filter element (10) configured for outside in flow comprising:

a proximal end cap (22) including a central outlet (23) therein;

a distal end cap (24) spaced from the a proximal end cap (22);

a cylindrical outer wrap (26) extending between the end caps (22 and 24) having perforations (28) there through on only a portion of the outer wrap (26) adjacent the distal end cap (24), wherein the flow (5) of PAG compressor oil is configured to flow into the element (10) through the perforations (28) in conventional operation, wherein the portion of the outer wrap (26) adjacent the distal end cap (24) having perforations (28) is 3 to 4 cm in length and at least 15% of the length of the outer wrap (26);

an outer layer of ion exchange polymers beads (30) radially within the outer wrap (26) configured to remove acid from the treated PAG compressor oil, and is an insoluble matrix including 0.45-0.65 mm diameter beads fabricated from an organic polymer substrate;

an annular particulate removing micro-glass media (34) adjacent the proximal end cap (22) and radially within at least a portion of the outer layer of ion exchange polymers beads (30) and configured to remove particulates from the treated PAG compressor oil, wherein the micro-glass media (34) extends from 5 cm to 15 cm along the length of the element (10) from the proximal endcap (22), wherein a distal end of the micro-glass media (34) is axially spaced from the portion of the outer wrap (26) having perforations (28) whereby the portion of the outer wrap (26) having perforations (28) is positioned axial closer to the distal end cap (24) than the distal end of the micro-glass media (34); and a central flow area (36) radially within the particulate removing micro-glass media (34) and in fluid communication with the central outlet (23).

17. The PAG compressor oil conditioning filter element according to claim 16 wherein the element (10) is configured to be received within filter housing (20) which includes a base with inlet and outlet ports, a housing sleeve and an end cap.

18. The PAG compressor oil conditioning filter element according to claim 17 further including a stainless steel element cap (40) closing a top of the micro-glass media element (34) and an inner scrim sleeve (42) provided within the particulate removing micro-glass media (34).

19. The PAG compressor oil conditioning filter element according to claim 18 further including a foam spacer adjacent the distal endcap (24).

20. The PAG compressor oil conditioning filter element according to claim 19 wherein the outer layer of ion exchange polymers beads (30) further include solid additives that condition the PAG compressor oil being treated to minimize swelling of the ion exchange beads (30).

\* \* \* \* \*